United States Patent
Crosier et al.

(10) Patent No.: US 7,710,587 B2
(45) Date of Patent: May 4, 2010

(54) METHOD AND SYSTEM FOR CONFIGURING AN ELECTRONIC DEVICE

(75) Inventors: Dale C. Crosier, Kirkland, WA (US); Aditha M. Adams, Seattle, WA (US); Taryn K. Beck, Seattle, WA (US); Adrian M. Chandley, Sammamish, WA (US); Pasquale DeMaio, Bellevue, WA (US); Steven T. Kaneko, Medina, WA (US); Carl J. Ledbetter, Mercer Island, WA (US); Scott Manchester, Redmond, WA (US); Benjamin Nick, Seattle, WA (US); Thomas G. Phillips, Bellevue, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1288 days.

(21) Appl. No.: 10/967,368

(22) Filed: Oct. 18, 2004

(65) Prior Publication Data
US 2006/0101456 A1 May 11, 2006

(51) Int. Cl.
G06F 15/00 (2006.01)
G06F 3/12 (2006.01)
G06K 1/00 (2006.01)
(52) U.S. Cl. .................... 358/1.15; 358/1.13
(58) Field of Classification Search .......... 358/1.1–1.18
See application file for complete search history.

(56) References Cited

U.S. PATENT DOCUMENTS

| | | | |
|---|---|---|---|
| 5,933,504 A | 8/1999 | Vanstone et al. | |
| 6,052,720 A | 4/2000 | Traversat et al. | |
| 6,078,667 A | 6/2000 | Johnson | |
| 6,148,354 A | 11/2000 | Ban et al. | |
| 6,178,507 B1 | 1/2001 | Vanstone | |
| 6,195,433 B1 | 2/2001 | Vanstone et al. | |
| 6,449,642 B2 | 9/2002 | Bourke-Dunphy et al. | |
| 6,526,264 B2 | 2/2003 | Sugar et al. | |
| 6,563,928 B1 | 5/2003 | Vanstone et al. | |
| 6,615,038 B1 * | 9/2003 | Moles et al. ................. | 455/418 |
| 6,654,841 B2 | 11/2003 | Lin | |
| 6,687,492 B1 | 2/2004 | Sugar et al. | |
| 6,700,450 B2 | 3/2004 | Rogers | |
| 6,714,605 B2 | 3/2004 | Sugar et al. | |
| 6,728,517 B2 | 4/2004 | Sugar et al. | |

(Continued)

OTHER PUBLICATIONS

U.S. Appl. No. 10/806,369, filed Mar. 23, 2004, Manchester et al.

(Continued)

*Primary Examiner*—Douglas Q Tran
(74) *Attorney, Agent, or Firm*—Woodcock Washburn LLP

(57) ABSTRACT

A method and system for configuring a new device are disclosed. The method includes using a host system to create a configuration file including data useable to configure the new device. A portable storage device is interfaced to the host and the configuration file is transferred to the storage device. The storage device is then interfaced to the new device and the configuration file is transferred to the new device. The configuration file is optionally used to configure the new device for communication over a network. A method for configuring the new device using a direct connection between the new device and a system bus of the host is also disclosed.

18 Claims, 7 Drawing Sheets

U.S. PATENT DOCUMENTS

| | | | |
|---|---|---|---|
| 6,754,725 | B1 | 6/2004 | Wright et al. |
| 6,785,520 | B2 | 8/2004 | Sugar et al. |
| 6,850,735 | B2 | 2/2005 | Sugar et al. |
| 7,165,154 | B2* | 1/2007 | Coombs et al. ............. 711/162 |
| 2001/0014153 | A1 | 8/2001 | Johnson |
| 2002/0082047 | A1* | 6/2002 | Souissi et al. ............... 455/557 |
| 2002/0090085 | A1 | 7/2002 | Vanstone et al. |
| 2002/0152380 | A1 | 10/2002 | O'Shea et al. |
| 2002/0152384 | A1 | 10/2002 | Shelest et al. |
| 2003/0101247 | A1 | 5/2003 | Kumbalimutt et al. |
| 2003/0225971 | A1 | 12/2003 | Oishi et al. |
| 2004/0002943 | A1 | 1/2004 | Merrill et al. |
| 2004/0010429 | A1 | 1/2004 | Vedula et al. |
| 2004/0024875 | A1 | 2/2004 | Horvitz et al. |
| 2004/0038592 | A1 | 2/2004 | Yang |
| 2005/0149204 | A1* | 7/2005 | Manchester et al. ............ 700/1 |
| 2005/0193103 | A1 | 9/2005 | Drabik |

OTHER PUBLICATIONS

U.S. Appl. No. 10/807,095, filed Mar. 23, 2004, Manchester et al.
U.S. Appl. No. 10/806,331, filed Mar. 23, 2004, Manchester et al.
U.S. Appl. No. 10/806,772, filed Mar. 23, 2004, Freeman et al.
U.S. Appl. No. 10/806,836, filed Mar. 23, 2004, Manchester et al.
U.S. Appl. No. 60/534,795, filed Jan. 7, 2004, Abraham et al.
U.S. Appl. No. 60/292,506, filed Jul. 30, 2004, Corbett et al.
U.S. Appl. No. 10/999,555, filed Nov. 30, 2004, Corbett.
U.S. Appl. No. 60/592,506, filed Jul. 30, 2004, Corbett et al.
Bailie, et al., "The Networked Digital Home," *Soundscapes Info*, (2002) printed Mar. 29, 2004, pp. 1-2, <http://icce.rug.nl/~soundscapes/VOLUME05/LSI_mediacast.html>.
Balfanz, et al., *Talking to Strangers: Authentication in ad hoc Wireless Networks*, In Symposium on Network and Distributed Systems Security, San Diego, California, 2002, printed Mar. 24, 2004, 15 pp., <http://citeseer.ist.psu.edu/balfanz02talking.htm>.
Harkins et al., *The Internet Key Exchange (IKE)*, Network Working Group RFC 2409, pp. 1-41 (Nov. 1998).
Huang, et al., *Making Computers Disappear: Appliance Data Services*, pp. 108-121, ACM Sigmobile Jul. 2001, Rome, Italy (2001).
Kent et al., *IP Authentication Header*, Network Working Group RFC 2402, 1-22 pp., Nov. 1998.
Kent et al., *IP Encapsulating Security Protocol*, Network Working Group RFC 2406, 1-22 pp. (Nov. 1998).
Maitland, *Okapi Unlocks iSCSI*, Jul. 30, 2002, 4 pp., <http://www.byteandswitch.com/document.asp?doc_id=19173>.
Nexware Corporation, "Software Solutions: Networked Solutions," Nexwarecorp.com (2001), printed Mar. 29, 2004, 1p., <http://www.nexwarecorp.com/products/networked_solutions.htm>.
Rescorla, *Diffie-Hellman Key Agreement Method*, Network Working Group RFC 2631, pp. 1-13 (Jun. 1999).
Schroder, *USB Pen Drives: Large Portable Storage in a Tiny Package*, (Dec. 2003) printed Mar. 24, 2004, 9 pp., <http://networking.earthweb.com/nethub/article.php/109503291891_1>.
Unknown, *Using Smart Cards With the Sun Ray 1 Enterprise Appliance*, Revision 01, 19 pp., Palo Alto, California (Sep. 1999).
Unknown, *Integrating Sun Ray 1 Enterprise Appliances and Microsoft Windows NT*, Sun Microsystems, Inc., 24 pp., Palo Alto, California (2000).
Unknown, *Smart Card for Temporary Facilities Security*, Information Methods Incorporated Group, LLC, pp. 1-16, (Jan. 2004).
Unknown, *Sun Ray Overview*, Sun Microsystems, Inc., 28 pp., Santa Clara, California (Apr. 2003).
Unknown, *Sun Ray Interoperability Brief*, Sun Microsystems, Inc., 14 pp., Santa Clara, California (Aug. 2003).
Unknown, "Sun Ray," *Editor's Choice Communication Solutions*, (Jun. 2004) printed Mar. 26, 2004, 8 pp., <http://www.tmcnet.com/comsol/0601/0601lab2.htm>.
Unknown, "Linksys Instant Wireless USB Network Adapter WUSB11 Network Adapter," *Product Review*, (2004) printed Mar. 24, 2004, 4 pp., <http://hardwarecentral.dealtime.com/xPR_Linksys_Instant_Wireless_WUSB11>.
Wakefield, *Wireless Technology and Your Mobile Device*, Microsoft Support WebCast, transcript pp. 1-13, slides pp. 1-60, printed Oct. 31, 2002, <http://support.microsoft.com/default.aspx?acid+%2Fservicedesks%2Fwebcasts%2Fen%2Fwc103102.asp>.
Ylisaukko-Ojai, et al., *Low Capacity Wireless Home Networks—Cheap and Simple Interconnections between Devices*, pp. 1-20, Version 1.0, Ilkk Korhonen,(May 2002).
In the United States Patent and trademark Office, Non-Final Office Action in re:. U.S. Appl. No. 11/000,130, Filing date Nov. 30, 2004, dated May 29, 2009, 21 pages.

* cited by examiner

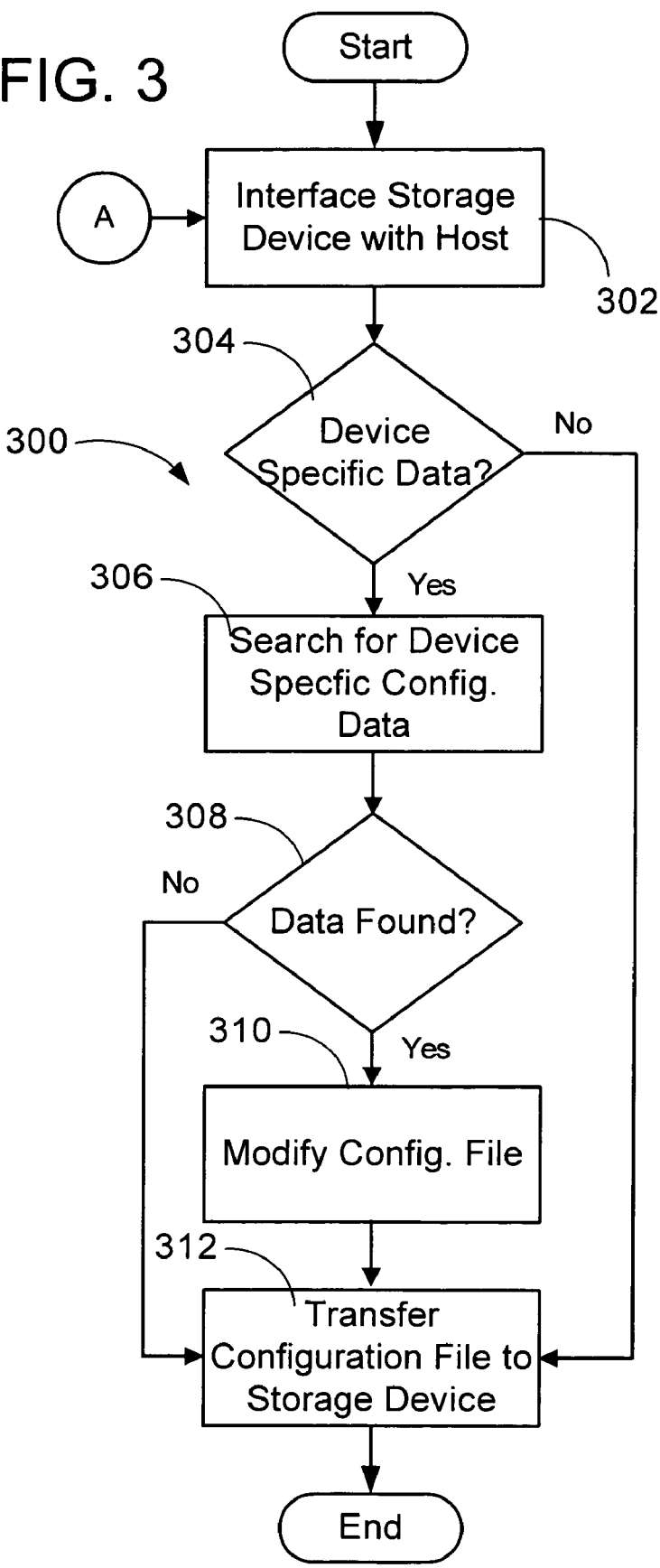

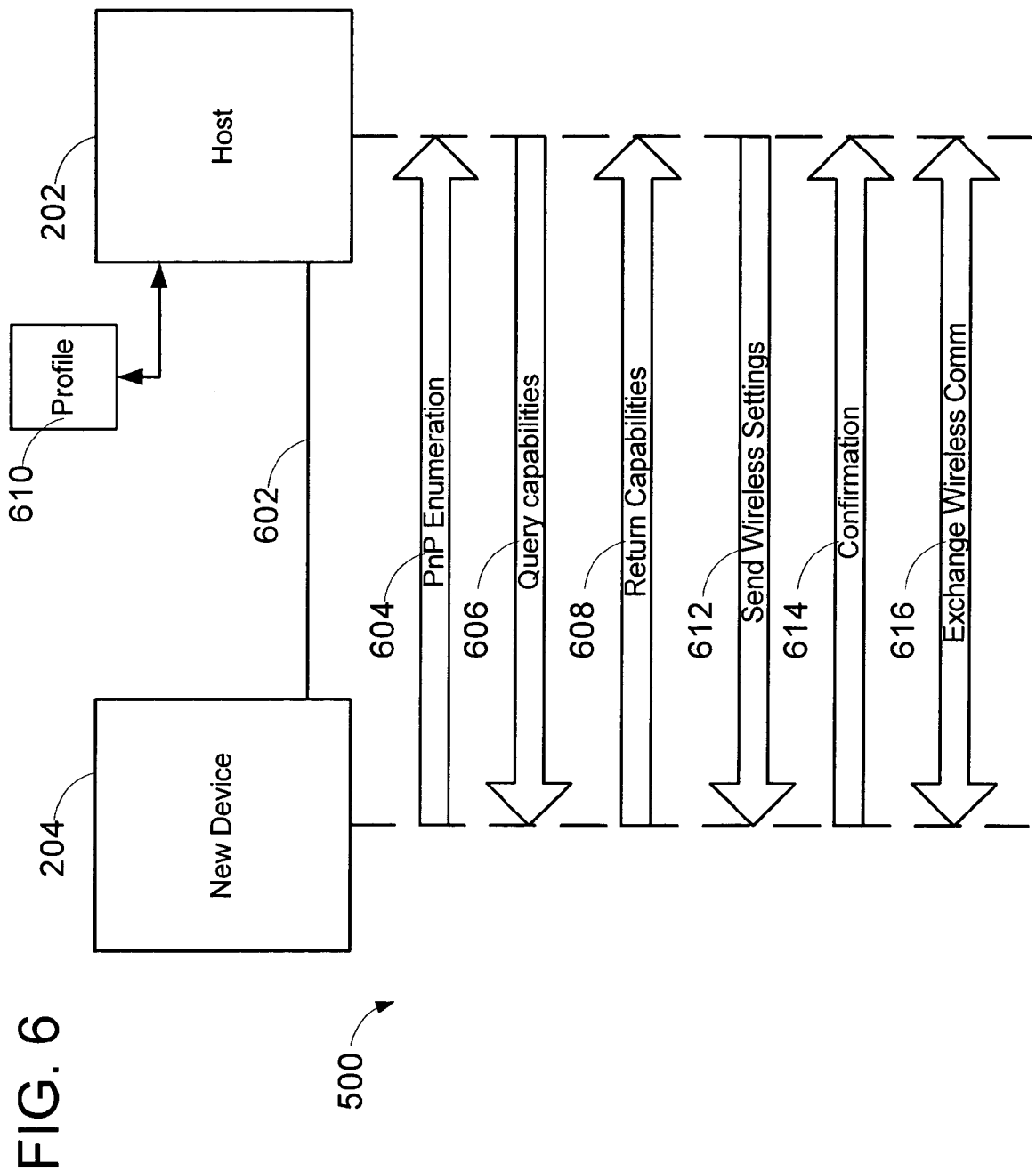

METHOD AND SYSTEM FOR CONFIGURING AN ELECTRONIC DEVICE

TECHNICAL FIELD

This invention generally relates to computer systems. More particularly, this invention relates to a method and system for configuring an electronic device.

BACKGROUND OF THE INVENTION

Many electronic devices are configurable. Such configuration typically requires entering data into the electronic device to be configured in order to program the device to operate in a particular way. Unfortunately, the user interface (UI) on many electronic device is limited. For example, the UI of the device may only include controls that are designed to facilitate its use, e.g., tuning a radio to a desired frequency, but that are not optimized for more complex data entry, which may be necessary as part of the device's initial configuration or to later change the device's operating parameters. As a result, using the device's UI to perform its configuration is often complex, counterintuitive, and prone to errors. Other electronic devices lack any UI at all or have such a limited UI, e.g., only an on/off button, such that configuring the device via its UI is impractical.

Even computers and other electronic devices having a more sophisticated UI are difficult to configure for some applications. For example, some home networks use wireless technology, such as 802.11 and Bluetooth-enabled technology. Wireless technology provides a desirable way to implement home networks because of its convenience, mobility, and flexibility. However, configuring devices to communicate over a home network usually requires manual entry of setup information at a network component, such as a wireless access point. This process is difficult for some users, particularly in the case of home networks where the user may lack experience in setting up networks. If the network uses a security protocol, setting up the network becomes even more difficult. The problems associated with setting up a network can be further compounded when data necessary to setup the network or to add a new network device needs to entered at a device that lacks a sophisticated UI.

From the foregoing, it is apparent that an improved method and system is needed to more efficiently allow electronic devices, computers, and peripherals to be configured and, if desired, integrated within a networking environment.

SUMMARY OF THE INVENTION

The invention is directed to a method and system for automatically configuring an electronic device without the need for complex data entry by a user. In accordance with the method of the present invention, configuring the electronic device includes using a host computer and a portable storage device. The portable storage device has an interface that is compatible with both the host and the new device. The portable storage device is first interfaced to the host and the host determines whether the portable storage device includes device specific data that uniquely identifies the electronic device. Based on the device specific data, or the lack of such device specific data, the host selects a configuration file having configuration data for the electronic device. A copy of the configuration file is then stored on the portable storage device. The portable storage device is then interfaced to the electronic device and the configuration data stored thereon is used to configure the electronic device.

In accordance with an embodiment of the present invention, the configuration data includes network configuration data that permits the electronic device to communicate over a network. Communication over the network is optionally conducted according to a security protocol.

Another embodiment of the invention is directed to a portable storage device or other device serving a similar purpose. The portable storage device is a multi-connector portable storage fob adapted to store configuration data for an electronic device and to provide an interface between a host computer and the electronic device. The storage fob includes a processor for executing program instructions and a memory for storing the configuration data. The storage fob also includes a plurality of interfaces including a first connector and a second connector. The first connector is adapted to interface to the host and the second connector is adapted to interface to the electronic device. The storage fob further includes a switch that prevents simultaneous electrical connection of the first and second connectors.

In yet another embodiment, the invention is directed to a method of configuring network components such as a network access point or client device. The network component is directly connected to the system bus of the host computer. Following a plug and play enumeration step, the host queries the network component for its network capabilities. The network component responds to the host with its wireless capabilities and the host creates a resultant profile defining a set of configuration settings. The configuration settings include wireless parameters to be used by the network component when communicating over the network. The host thereafter sends the set of configuration settings to the network device, which device is configured according to the configuration settings. The network component is then capable of communicating over the network.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a block diagram generally illustrating a method for creating a configuration file and transferring the configuration file to a portable storage device according to the present invention;

FIG. 6 is a sequence diagram generally illustrating a method of configuring a device to communicate over a network by directly connecting the device to the system bus of a host device.

DETAILED DESCRIPTION OF THE INVENTION

Figure 1:
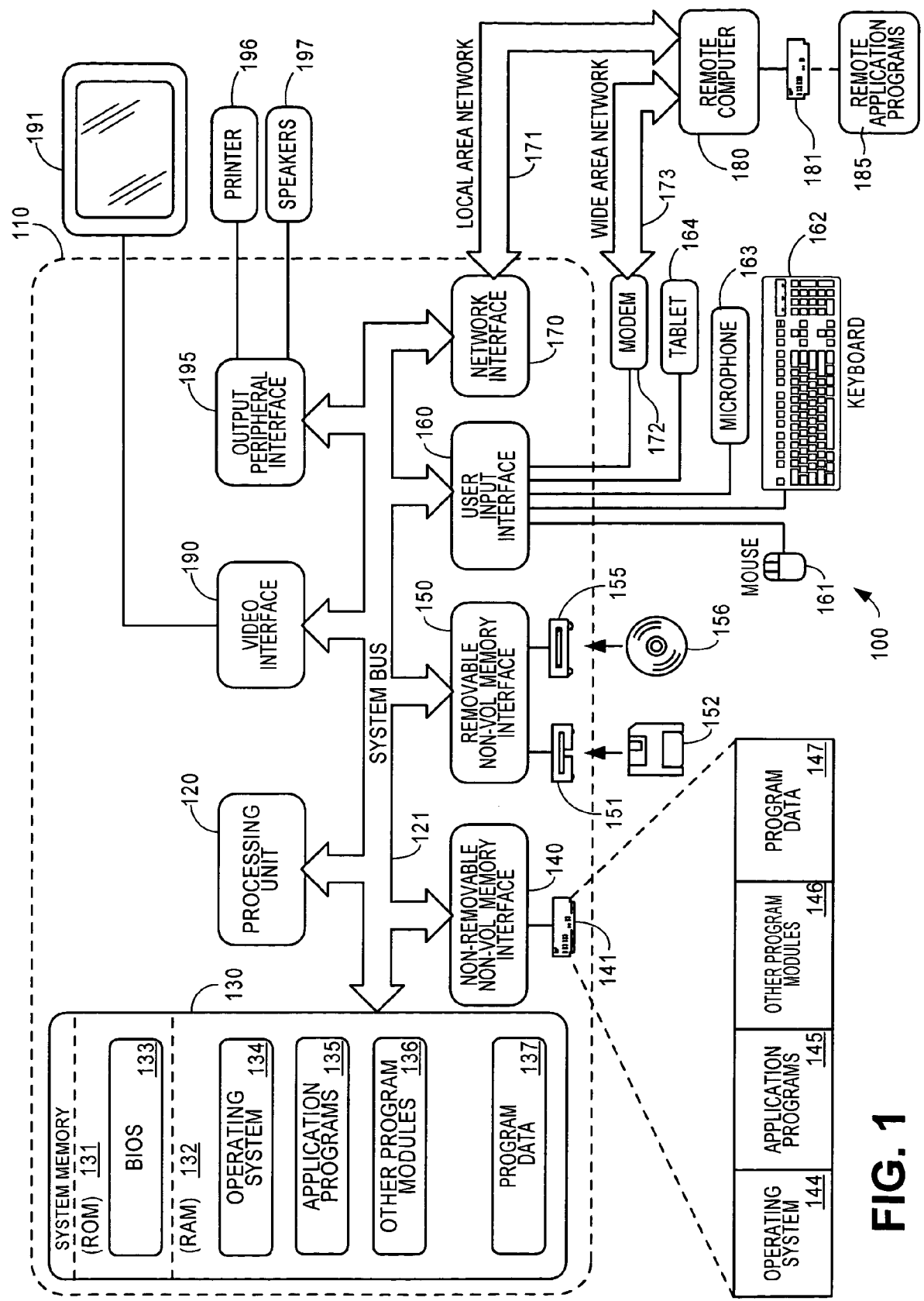
FIG. 1 is a block diagram generally illustrating an exemplary computer system that may be used to carry out the methods of the present invention.

A method and system for configuring an electronic device will now be described with respect to certain embodiments. The methods include using a portable storage device, or alternatively a direct system bus connection, to obtain data from the electronic device and to transfer configuration information from a host to the electronic device. In one embodiment, the system includes a multi-connector portable storage fob used to transfer data between the host and the electronic device as part of the configuration method. Those skilled in the art will appreciate that the methods and systems described herein are merely exemplary and that variations can be made without departing from the spirit and scope of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that performs particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. Other components may be connected to interface 150 such as a storage fob or multi-connector storage device in accordance with the invention.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
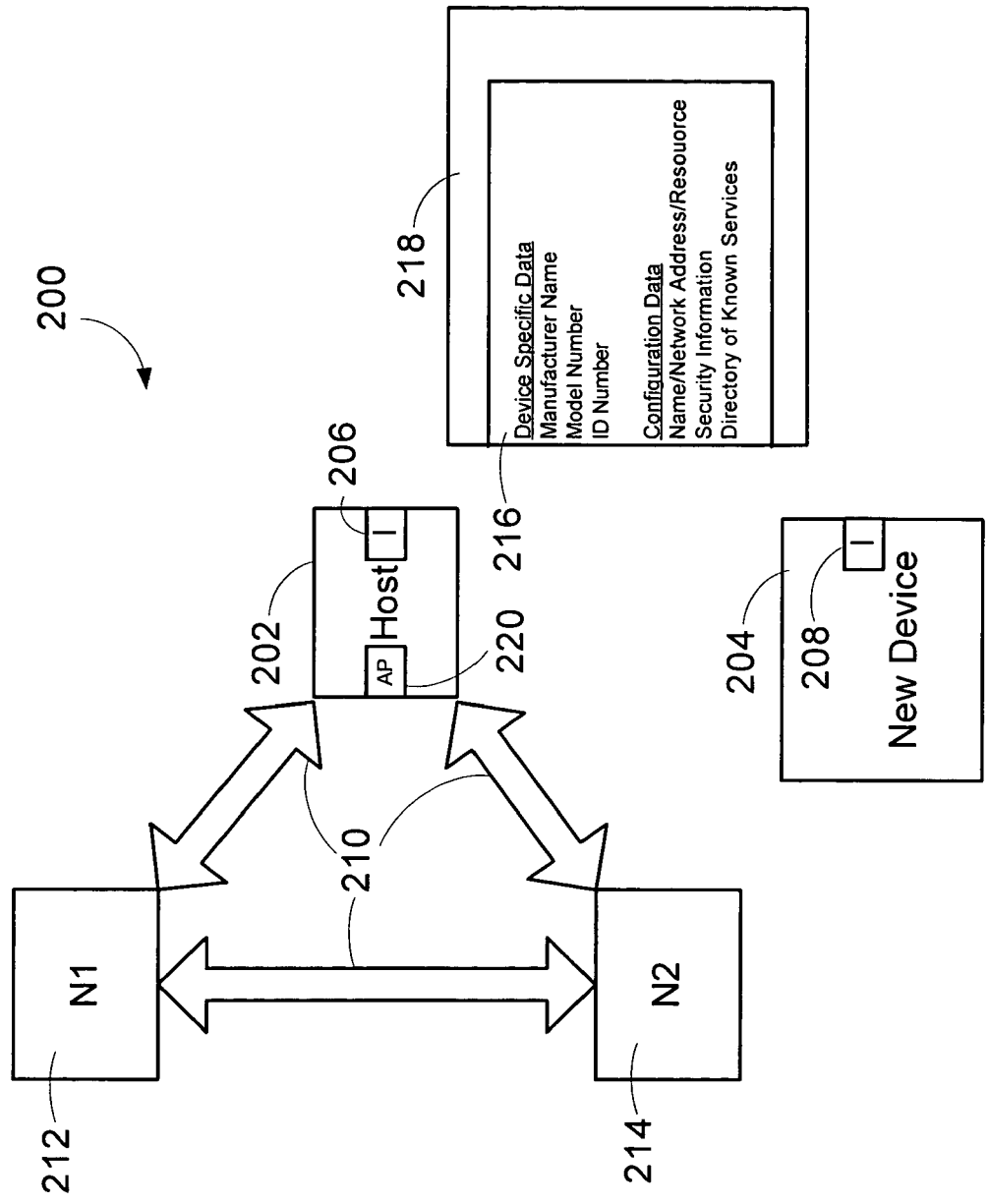
FIG. 2 is a block diagram generally illustrating an operating environment wherein the method of the present invention may be employed.

FIG. 2 illustrates an example of an operating environment 200 wherein the present invention is used. The invention provides a method and system for configuring a new device. In accordance with a method of the present invention, the host is interfaced to a portable storage device (PSD). The host creates a configuration file having usable configuration data, a copy of which is stored on the PSD. The PSD is then interfaced to the new device and the configuration file is used to configure the new device. In an alternative method, the configuration file is transferred from the host to the new device via a cable that directly connects the new device to a system bus of the host.

As generally shown, the environment 200 includes a host 202 and a new device 204. The host 202 is any suitable computing device such as the computing device described with reference to FIG. 1. By way of example and not limitation, suitable computing devices include laptop computers, desktop computers, and PDAs to name few. The environment 200 also includes a PSD 218. The PSD 218 is any suitable device that permits transfer of data from the host 202 to the new device 204, examples of which are set forth in the description that follows.

The host 202 includes an interface 206. Through the interface 206, the host 202 is communicatively coupled to external devices, such as the PSD 218. In one embodiment, the interface 206 provides a physical connection to an external device. Examples of suitable types of interfaces that provide the physical connection include serial port, parallel port, PCI port, or any type of USB port. Alternatively, the interface 206 provides a wireless connection to external devices. Examples of suitable interfaces that provide the wireless connection include an infrared transmitter/receiver or RF circuit capable of reading from and writing to an RF Id tag type device. The interface 206 is integral to the host 202 or alternatively is a separate device connected to, and in communication with, the host. Of course, it will be understood that the host 202 may include a plurality of interfaces and each of the plurality of interfaces may be of a different type.

The new device 204 is any electronic device capable of being configured, i.e. programmed with data that represents user preferences or that provides instructions on tasks to be performed. The new device 204 includes electronic components and circuitry that facilitate its configuration. Examples of such electronic components include a microprocessor or microcontroller and temporary or permanent storage, such as RAM, EEPROM or flash memory. By way of example and not limitation, types of new devices 204 include media players, cameras, watches, cell phones, personal digital assistants (PDAs), remote controls, IP speakers, consumer electronics, A/V equipment, TVs, satellite receivers, printers, faxes, computers, routers, wireless access points, and bridges.

The new device 204 also includes an interface 208 that permits the new device to interface to external devices. The interface 208 of the new device 204 provides a physical or wireless connection to an external device, examples of which include serial port, parallel port, USB port, infrared transmitter/receiver, or a writeable RF tag. The type of connection provided by the interface 208 of the new device 204 need not be the same type of connection provided by the interface 206 of the host 202.

The operating environment 200 optionally includes a network 210. The network 210 includes the host 202 and other network devices, such as network nodes 212, 214. The network nodes 212, 214 are any suitable electronic device having a network interface. Although not shown, one or more of the host 202, the network nodes 212, 211, and the new device 204 are further optionally connected to an external network such as the Internet.

The network 210 is implemented in any suitable manner. Examples of suitable networks include Ethernet, 802.11 wireless, Wi-Fi, Home Phone Line Network (HomePNA) and the like. The network may include other components necessary for wireless communication, such as wireless access point (WAP) 220 needed for some types of networks, such as 802.11 compliant networks. The WAP 220 may be integral to the host 202 or, alternatively, may be a separate device communicatively coupled to the host 202.

The network 210 optionally employs a security protocol to protect the data exchanged over the network. Examples of known network security protocols include Wireless Equivalent Privacy (WEP), Wi-Fi Protected Access (WPA), and Internet Protocol Security (IPSec). It will be understood that the forgoing types of networks and security protocols are only provided by way of example, and not limitation, as the present invention is capable of being implemented with any suitable type of network and security protocol.

According to the method and system of the present invention, the host 202 configures the new device 204 by creating a configuration file 216 (also referred to herein as a profile), or other representation or locator for desired device settings, and transferring a copy of the configuration file 216 to the new device 204 using a personal storage device (PSD) 218. The method of creating and transferring a copy of the configuration file 216 using the PSD 218 is further described with reference to FIG. 3, FIG. 4a and FIG. 4b.

In one embodiment of the present invention, the PSD 218 is an external device capable of communicating with the host 202 and the new device 204 via their physical or wireless interfaces. A specific example of an external PSD is a multiconnector storage fob described with reference to FIG. 5. However, as used herein, the term PSD 218 includes any device that is capable of transferring a copy of the configuration file 216 from the host 202 to the new device 204. For example, the PSD 218 may be storage media, such as floppy disk, CD ROM or DVD disk, or may be a cable that physically connects the new device 204 to the system bus 121 (FIG. 1) of the host 202.

In another embodiment of the present invention, the PSD 218 is integral, i.e. a component part of, the new device 204. For example, the PSD 218 is an RF Id tag integral with the new device 204. RF Id tags are known devices that can be read from, or written to, when brought into proximity of an RF read/write device.

The data in the configuration file 216 includes one or both of device specific data and configuration data. Alternatively, the configuration file includes a representation or locator for the device specific data or configuration data. The configuration data is data used to configure the new device 204. In the example shown, the configuration data includes a network identifier, security information and known services. The network identifier is data that identifies the particular network to which the new device is added. Examples of such network identifiers include a security set identifier (SSID), which provides a numeric identification of a network, a computer name, a domain name and/or a workgroup name.

The security information is data needed to communicate over the network using a security protocol. Such information includes, by way of example, identification of a security protocol and a secret, e.g. a cryptographic key, to be shared by the new device and other network devices. Examples of security protocols include WEP, WPA, and IPSec to name a few. The key is used for authentication and implementation of the security protocol and may be used derive additional cryptographic keys. Because the user is not required to manually enter the key, a large key value, i.e. key value of many bits, can be used without increasing the complexity of the configuration process. Accordingly, the present invention facilitates a more secure environment as larger key values generally correspond to cryptographic algorithms that are more difficult to compromise.

The known services data identifies a location on the network where the new device obtains additional configuration data or other information that is usable by the new device. For example, the directory of known services may include identification of a particular directory on the host such as "Music=\shared music" that includes audio files. If the new device has the ability to play audio files, such known services data provides the new device with the location on the network where the audio files are accessible. If the network 210 is coupled to an external network, such as the Internet, the known services may include a uniform resource locator (URL) address that is accessible by the new device, e.g., "www.foo.com." The known services data may also be a location and name of a particular application usable by the new device. The new device can then load the application into its memory or use the application via the host.

It will be understood that the foregoing descriptions of types of the configuration data are exemplary. The exact configuration data included in the configuration file 216 depends upon the type of new device 204 to be configured and its capabilities. For example, if the device is not capable of communicating over a network, or if a network is not used, network settings, such as network identification and security setting are not used. Examples of other types of configuration data include data representing the time and date or data that represents a user's favorite radio or TV channels. If the new device is a computer or PDA, the configuration data can include common setup data that user wants to transfer to the device. For example, the common setup data includes data that identifies favorite web sites or user preferences such as a default printer to name a few.

The device specific data is used for at least two purposes in accordance with the present invention. First, the device specific data is usable by the host 202 to determine the type of new device 204, which allows the host 202 to construct a configuration file 216 appropriate for the new device 204. Second, the device specific data is usable by the host 202 to add the new device 204 to the network 210.

The device specific data includes data that uniquely identifies the new device 204. An example of device specific data is identification of the manufacturer name, make and model of the new device 204, e.g. "ABC Corp. Radio Model 123." Alternatively, or in conjunction with the foregoing example, the device specific data includes an identification number that is unique to the device such as a serial number, RF Id, or media access control (MAC) address.

Turning to FIG. 3, an example of a method 300 used to identify configuration data for the new device and to transfer a copy of the configuration file 216 to the new device 204 via the PSD 218 will now be described.

As shown in step 302, the host 202 interfaces to the PSD 218. As previously described herein, the host 202 includes interface 206 that provides a physical connection to the PSD 218. The PSD 218 includes a suitable reciprocal interface. For example, if the interface 206 of the host 202 is a USB port, the PSD 218 includes a compatible USB connector. Alternatively, the host 202 includes interface 206 that provides a wireless connection to the PSD 218 and the PSD 218 includes a reciprocal wireless interface. For example, the host includes an RF Id tag read/write device and the PSD 218 includes an RF Id tag.

In step 304, the host 202 determines whether the PSD 218 includes a configuration file 216 stored thereon. If the PSD 218 includes a configuration file 216, the PSD 218 determines whether the configuration file 216 includes device specific data corresponding to the new device. The device specific data is stored on the PSD 218 if the PSD was previously interfaced with the new device 204 or if the PSD 218 is integral to the new device 204. As previously described, the device specific data uniquely identifies the new device, examples of which include a device type, manufacturer name, model number, serial number, RF Id, MAC address or combination thereof.

If the PSD 218 does not include device specific data, the host transfers a copy of the configuration file 216 to the storage device as shown in step 312. In this case, the configuration data is default configuration data. An example of default configuration data is data needed for the new device to communicate over the network, e.g. network identification, security information, and the like. Alternatively, if the PSD 218 does not include device specific data, the host elects not to attempt to configure the new device 204 in which case the process ends. If this occurs, the PSD 218 can be interfaced to the new device 204 to obtain a configuration file 216 having device specific data as described with reference to FIG. 4a and the process 300 can be repeated.

Returning to step 304, if the PSD 218 includes device specific data, the host 202 attempts to use the device specific data to identify configuration data specific to the new device as shown in step 306. For example, the host 202 may have a stored configuration file 216 for the same device, which may occur, for example, if the new device 204 was previously configured but needs to be reprogrammed. As another example, the host 202 may have created a previous configuration file for a device of the same type, e.g. radio, and certain configuration data from the previous configuration file is suitable configuration data specific to the new device, e.g. data that represents the user's favorite channels. As yet another example, the host 202 may communicate with other network devices to obtain suitable configuration data specific to the new device. Alternatively, or in combination with the foregoing, the host 202 uses the device specific data to search for configuration data specific to the new device on an external network, such as the Internet. For example, the host searches the website of the manufacturer to find configuration data specific to the new device. Thus, if the device is of a type Widget manufactured by ABC Inc., the host accesses the internet and attempts to access the website ABC.com. If the site exists, the host then searches for configuration data for "Widget."

After the host 202 identifies the configuration data specific to the new device 204, the host 202 modifies the default configuration file to include the configuration data specific to the new device 204 as shown in step 310. The host then transfers the configuration file 216 to the PSD 218 as shown in step 312. After the process 300 is complete, the PSD 218 is disconnected from the host 202.

In an alternative embodiment, if the PSD 218 includes device specific data, as determined in step 304, the host 202 attempts to communicate with the new device 204 over the network 210 using, for example an RF Id, MAC address or other suitable device specific data. If the host 202 is able to communicate with the new device 204, the new device is added to the network 210 and, optionally, the new device 204 is configured by the 202 host via the network connection.

Figure 4A:
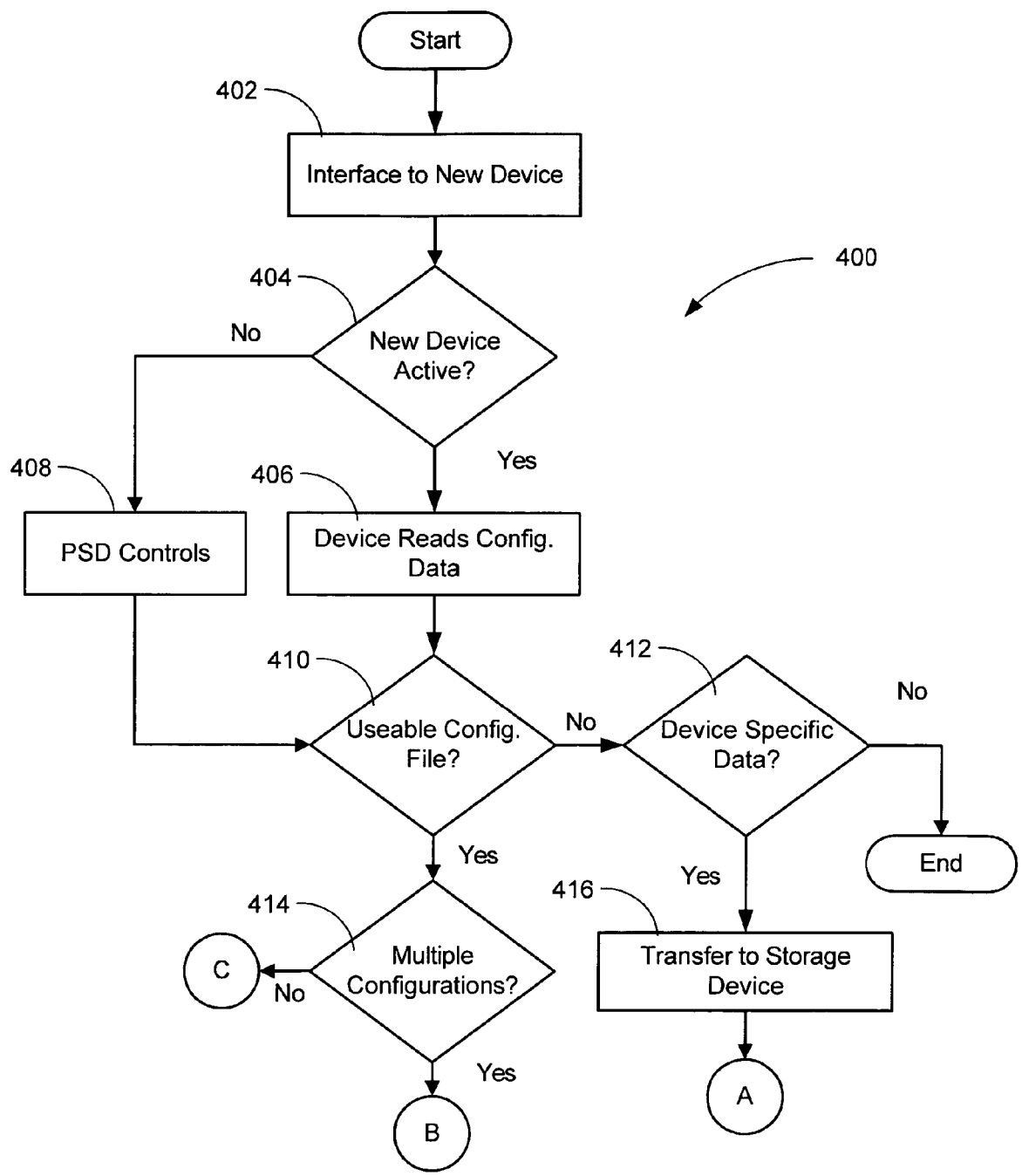
FIG. 4a is a block diagram generally illustrating a method for configuring a device according to the present invention.
Figure 4B:
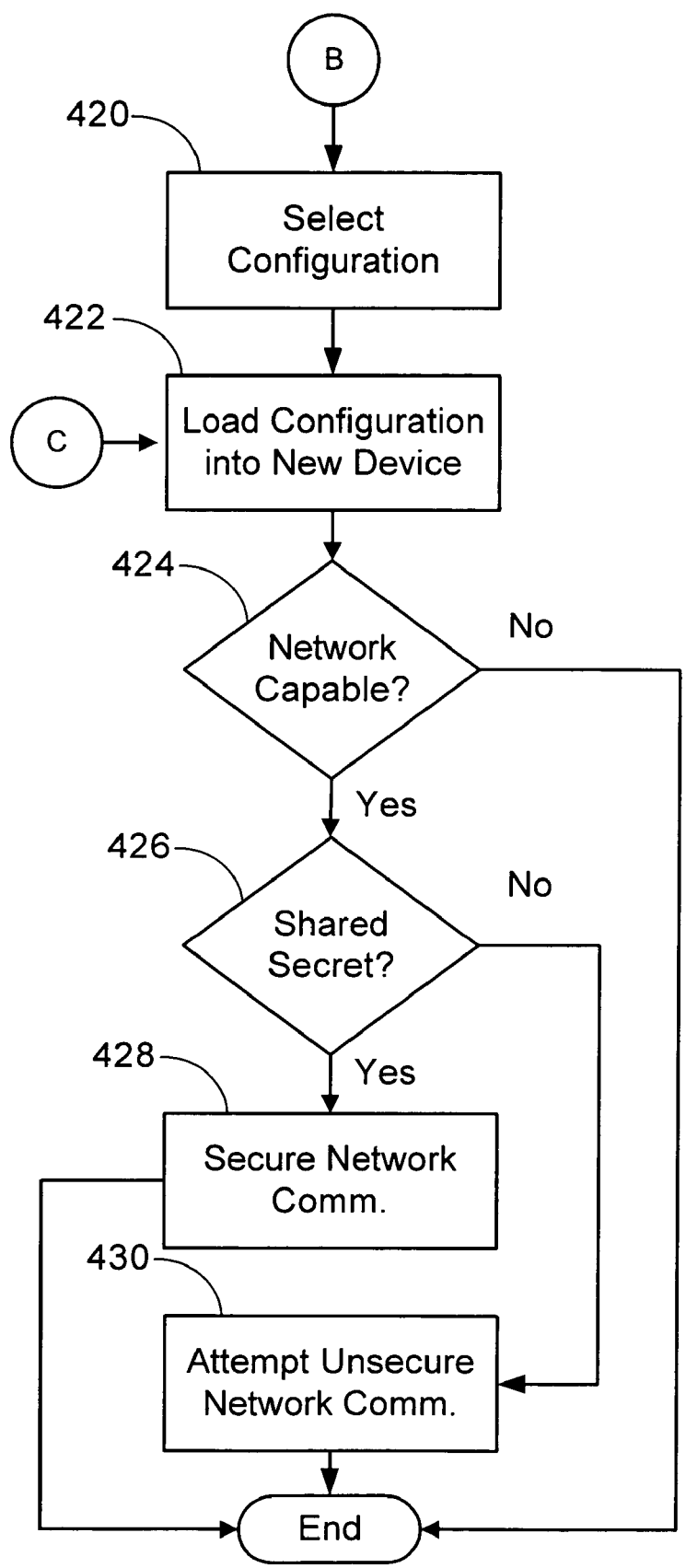
FIG. 4b is a block diagram generally illustrating a method for configuring a device according to the present invention.

FIG. 4a and FIG. 4b illustrate a method 400 that is used to transfer a copy of the configuration file from the PSD 218 to the new device 204. The method is used after a copy of the configuration file 216 is transferred from the host 202 to the PSD 218 as described with reference to FIG. 3. Alternatively, the method 400 is used before the PSD 218 is interfaced to the host 202 to place device specific data onto the storage device, which is then used by the host 202 to construct the configuration file 216 as described with reference to FIG. 3.

The PSD 218 is first interfaced to the new device 204 as shown in step 402. By way of example, if the PSD 218 and the new device 204 each provide a physical interface, such as USB port/connectors, the USB connector on the PSD 218 is inserted into the appropriate interface 208 on the new device 204. If the PSD 218 and new device 204 each provide a wireless interface, e.g., an infrared transmitter/receiver, step 402 is executed by bringing the PSD 218 within range of the new device 204, i.e., such that the PSD 218 and new device 204 can communicate via the wireless connection. Optionally, if step 402 is being carried out for the first time, i.e., the PSD 218 has not previously been interfaced to the new device 204, a driver program is automatically transferred from the PSD 218 to the new device 204 to permit communication therebetween. Automatically downloading the driver is appropriate if the new device 204 is not capable of recognizing the PSD 218 without the driver, as is the case with some older software programs and USB compliant storage devices. Such driver programs and methods for downloading drivers are known and need not be described in more detail herein.

In step 404, the PSD 218 determines whether the new device is an active device or a passive device. An active device is a new device 218 that attempts to read the configuration file 216 from the PSD 218 following execution of step 402 within a predetermined period of time. A passive device exhibits the opposite behavior, i.e. does not attempt to read from the PSD 218 following execution of step 402. Thus, if the new device 204 attempts to read from the PSD 218 within the set period of time, it is determined to be an active device. If the new device 204 fails to attempt to read from the PSD 218 within the set period of time, it is determined to be a passive device.

If the new device 204 is active, the new device 204 controls and reads the configuration file from the PSD 218 as shown in step 406. Otherwise, as shown in step 408, the PSD 218 device controls the remaining process 400.

In step 410, a determination is made as to whether at least one usable configuration file exists on the PSD 218. A usable configuration file includes configuration data recognized by the new device 204. For example, if the new device includes a network interface, configuration file 216 having configuration data with network parameters, such as network identification and security data, is a usable configuration file. If the new device 204 is a radio tuner, configuration file 216 having configuration data that identifies preset channels or a location where preset channels are stored on the network, forms a usable configuration file. On the other hand, if the new device 204 does not include a network interface and the configuration file 216 is limited to network configuration data, the configuration file is not a usable configuration file for the new device 204.

If a usable configuration file does not exist, the method 400 proceeds to step 412 and a determination is made as to whether the new device 204 includes any device specific data. As described previously herein, device specific data includes, for example, a manufacturer name and model number of the new device 204. Alternatively, or in combination with the foregoing, the device specific data includes an identification code, such as an RF Id code. If device specific data exists, the device specific data is transferred to the PSD 218 as shown in step 416. The device specific data is then usable by the host to attempt to create the usable configuration file by, for example, carrying out the method described with reference to FIG. 3. If the new device 204 does not include device specific data, the process ends.

Returning to step 410, if at least one usable configuration file exists, the method 400 proceeds to step 414 where a determination is made as to whether multiple usable configuration files exist. For example, the PSD 218 may include a plurality of configuration files with network configuration data wherein each file represents a different level of network privileges, e.g., a first configuration file for system administrators, a second configuration file for users, and a third configuration file for guests.

If multiple usable configuration files exist, the method 400 proceeds to step 420 where one of the configuration files is selected. Any suitable process is used to select the configuration file. For example, the most recent usable configuration file is selected. Alternatively, the PSD 218 may include a switch whose position determines which configuration file is selected. For example, if the plurality of usable configuration files each include configuration data for different levels of network privileges, the switch is used to determine which privilege level, e.g., administrator, user, or guest is appropriate and to be selected for the new device 204. The configuration file 216 having the configuration data that matches the privilege level represented by the switch position is the selected usable configuration file.

After one of the usable configuration files is selected, a copy of the selected configuration file is loaded onto the new device 204 as shown in step 422. Returning to step 414, if only a single usable configuration file exists, a copy of the single usable configuration file is loaded onto the new device 204 as shown in step 422 without the need to select among multiple configuration files. The configuration file 216 is then stored in the temporary or permanent memory or both of the new device 204.

If the new device 204 is not capable of communicating over the network, i.e. does not have a network interface, or if the configuration file does not include network configuration data, the process ends as shown at step 424.

If the new device 204 is network capable, it examines the configuration file to determine whether the network uses secure communication and, if secure communication is used, examines the configuration file to determine whether it includes a shared secret as shown in step 426. The shared secret may be an encryption key such as a WEP or WPA key. If the shared secret exists, the new device initiates secure communication, e.g. WEP, or WPA with the host or other network devices as shown in step 428. If the shared secret does not exist and the network configuration data does not specify a security protocol, the new device 204 attempts to communicate with the host 202 or other network device over an unsecure channel as shown in step 430.

Once network communication is initiated, the new device 204 accesses any data stored on the network that is identified in the known sources portion of the configuration file 216. For example, if the new device is a radio tuner, it accesses data at a path identified in the configuration file, e.g. "\mymusic\presets." The data in the location identified by the configuration file is then used to configure the device.

The method 400 is repeated for each new device to be configured and/or added the network. The host 202 may save the specific configuration file created for the new device 204. This facilitates reconfiguration of the new device 204 should it lose its configuration. Additionally, the user may update user information or preferences. By way of example and not limitation, the user changes the list of preset channels to be used with radio receivers. The method 400 is then repeated to reconfigure the new device 204. Alternatively, the new device 204 is programmed to periodically check the configuration information on the network and automatically updates its configuration without the need for user intervention.

Figure 5:
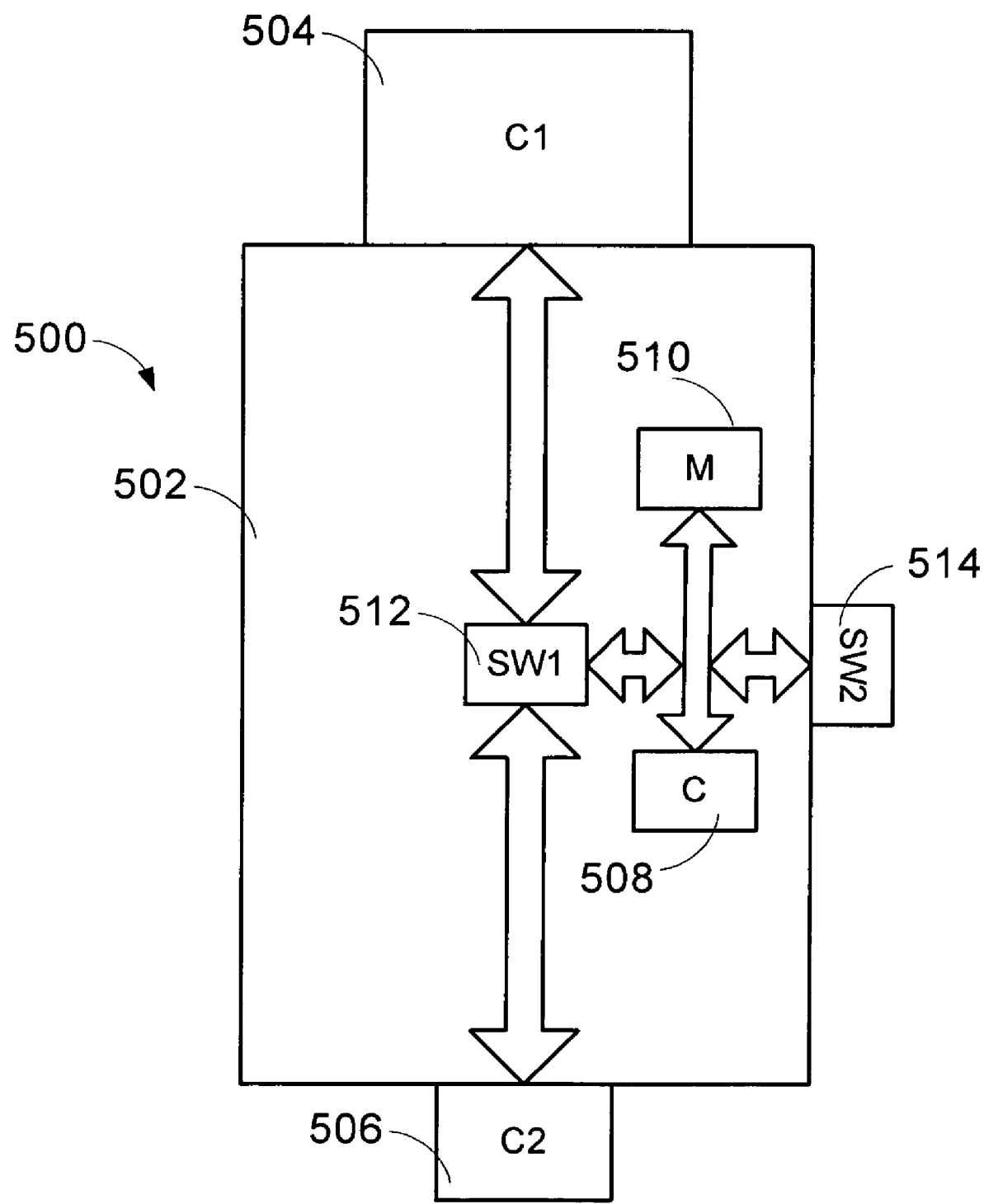
FIG. 5 is a block diagram generally illustrating an example of a portable storage device that may be used to carry out the methods of the present invention.

Turning to FIG. 5, a block diagram illustrating an example of the PSD 218 that may be used to carry out the methods of the present invention will now be described. The specific example of the PSD 218 described with reference to FIG. 5 is referred to herein as a multi-connector storage fob 500.

The multi-connector storage fob 500 includes a housing 502, a first connector 504 and a second connector 506. The housing 502 is made of any suitable material, one example of which is plastic. The housing is further any suitable shape and size, but is preferably small enough to be hand held so as to maximize its portability. The multi-connector storage fob 500 further includes electronic circuitry and components within the housing. The electronic circuitry includes a controller 508, a memory 510, and a first switch 512. The multi-connector storage fob 500 also optionally includes a second switch 514.

The controller 508 is any suitable microprocessor or microcontroller. The memory 510 is one or more types of volatile or non-volatile memory, examples of which include RAM, EEPROM, and Flash Memory. The electronic circuitry is communicatively coupled to the first connector 504 and the second connector 506 through the first switch 512.

The first and second connector 504, 506 are any suitable type for providing an electrical connection. Examples of known types of connectors include A-type USB, B-type USB, mini-USB, PCI, serial port connector, and parallel port connector, to name a few. Alternatively, one or both of the first and second connectors 504, 506 provide a wireless interface, such an RF or infrared interface. Preferably, the first and second connectors are different types. For example, the first connector is the A-type USB connector, while the second connector is the mini-USB connector. Having the first and the second connectors 504, 506 be of different types increases the variety of types of new devices and hosts that can be used with the multi-connector storage fob 500. For example, the host may include the A-type USB port while the new device 204 includes the mini-type USB port.

The first switch 512 is an electronic switch that only permits one of the first or second connectors to be active, i.e. in communication with the electronic circuitry at any given time. When one of the first or second connectors is interfaced to the host 202 or the new device 204, the first switch 512 electronically disconnects the other of the first or second connectors from the electronic circuitry. Any suitable electronic switch is used to implement the first switch, such as a transistor, relay and the like.

In an alternative embodiment, the first switch 512 is implemented with an electromechanical switch. For example, the first switch 512 is implemented with a slide switch, toggle switch, or the like. When the slide switch is in a first position, the first connector is active, i.e. electrically interfaced to the electronic circuitry in the storage fob. When the slide switch is in the second position, the second connector is active.

In another alternative embodiment, the first switch 512 is implemented such that it physically prevents both the first and second connectors from being interfaced to external devices at the same time. For example, the first switch 512 is implemented as a sleeve slideably mounted onto the outside of the housing 502. The sleeve is dimensioned such that when one of the first or second connectors is exposed, the other connector is mechanically covered so as to preclude both the first and second connector from being physically interfaced to other devices at the same time. In this embodiment, the electronic circuitry is coupled directed to the first and second connectors.

The first switch 512 is used to prevent damage to the multi-connector storage fob 500 that may otherwise occur if both the first and second connectors are simultaneously connected to different electronic devices. Accordingly, it will be appreciated that if one or both of the first and second connectors provide a wireless interface, the first switch is not required and is optionally not included as part of the multi-connector storage fob 500.

The optional second switch 514 is any suitable mechanical switch, such as pushbutton, slide switch or toggle switch. Alternatively, or in combination with the mechanical switch, the second switch is a biometric device such as a finger print reader. The function of the second switch is to indicate a setting, such as administrative, user, or guest, that is used to select one usable configuration file from a set of usable configuration files. The second switch is interfaced to the electronic circuitry such that its position or other information provided by the switch can be read and processed by the controller 508.

FIG. 6 illustrates a method 600 according to the present invention that is used to configure the new device 204 to communicate within the network 210, wherein the network 210 is a wireless network. Unlike the methods described with reference to the preceding figures, the method 600 described with reference to FIG. 6 includes the use of a wired connection between the host 202 and the new device 204 to be configured. In one embodiment, the new device 204 is a wireless access point (WAP). In another embodiment, the new device 204 is a client network device having wireless capabilities such as a computer, printer, or other electronic device having a wireless network interface.

The host 202 includes a system bus 121 (FIG. 1). Examples of types of the system bus 121 include USB, PCI, PCI express, IEEE 1394 and the like. In a first step, the new device 204 is connected to the host 202 using a cable 602. The type of cable 602 used depends upon the type of system bus 121. For example, if the bus is USB, the new device 204 is connected to the host 202 using a USB cable. If the bus is IEEE 1394, the new device 204 is connected to the host 202 using a 1394 Firewire cable.

In a second step, the new device 204 initiates a plug and play (PnP) enumeration phase 604. The PnP enumeration phase 604 is a known process that need not be described in detail herein. Briefly, however, PnP enumeration is a process that provides for automatic and dynamic recognition of installed hardware. During the PnP enumeration phase, the new device 204 announces its presence by sending, to the host 202, data such as a product identifier. A PnP manager at the host 202 receives the data from the new device 204 and determines which drivers are required to support the new device 204. The host 202 then loads any such required drivers. The PnP manager also notifies any processes that have registered to be notified of corresponding PnP events, such as device registration.

In a third step, the host 202 transmits a query 606 to the new device. The query 606 includes a request for the wireless capabilities of the new device 204. In a fourth step, the new device 204 provides a response message 608, which includes the wireless capabilities of the new device 204. Examples of wireless capabilities include the type of wireless networks supported, e.g. 802.11, authentication and security methods supported, e.g. WEP, WAP and the like, as well as other information such as manufacturer, model, firmware version and the like.

After receiving the wireless capabilities of the new device 204, the host 202 creates a profile 610, which includes a set of wireless settings. The wireless settings include parameters to be used by the new device 204 for network communications. Examples of the parameters in the wireless settings include identification of a protocol, e.g. WEP or WAP, cryptographic key, and network identification, e.g. SSID. If the new device is a wireless access point, the wireless settings also include a mode. The mode identifies how the wireless point will function, e.g. as a wireless access point, point-to-point bridge, point-to-multipoint bridge, or wireless client.

Any suitable mechanism is used to create the profile 610 and the wireless settings included therein. For example, the wireless settings are entered by a user via a Graphical User Interface (GUI). Preferably, the user enters the wireless settings after viewing the wireless capabilities of the new device via the GUI so that the wireless settings are consistent with the device's wireless capabilities, e.g. identify a wireless network type and security protocol that the new device is capable of using. Alternatively, the wireless settings are automatically selected based on a set policy. For example, the policy may require using secure communications and further using a cryptographic key having a certain number of bits. If the new device 204 is not capable of network communication according to the policy, the host may elect not to configure the new device 204 in which case the method 600 is terminated.

After the profile 610 is created for the new device, the set of wireless settings therein are transmitted to the new device 204 in a message 612. After receipt of the message 612, the new device 204 configures its settings according to the wireless settings in the message 612. If the new device successfully configures its settings according to the wireless settings, a confirmation message 614 is optionally sent from the new device 204 to the host 202. Wireless communication via the network is then initiated as shown in step 616.

The new device 204 optionally implements security measures after the new device 204 is connected to the system bus. For example, if the new device 204 is a wireless access point, the wireless network is disabled to prevent unauthorized access to the network before secure communication (e.g. WEP or WAP) is enabled. Further, if the new device 204 includes an interface to an external network, such as the Internet, the interface to the external network is disabled. Disabling the interface to the external network provides another way to prevent unauthorized access to the network and to the new device 204. After the method of FIG. 6 is completed, the wireless network may be enabled and/or access to the external network may be restored.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof. Additionally, although the methods and systems described herein were described with reference to examples of certain consumer electronic devices and home networks, it will be appreciated that the methods and systems can readily be employed with any network or to configure any device. For example, the method and system can be used in a corporate network environment and to configure commercial or industrial electronic devices.

We claim:

1. A method for configuring a new device using a host computer having configuration data and a portable storage device, wherein the portable storage device is adapted to interface to the host and the new device and to transfer data therebetween, the method comprising:

interfacing the portable storage device to the host computer;

determining whether the portable storage device includes device specific data that identifies the new device;

selecting first configuration data to be included in a configuration file, wherein the first configuration data is usable by the new device, and wherein selecting the first configuration data comprises selecting device specific configuration data if the portable storage device includes the device specific data and selecting default configuration data if the portable storage device does not include the device specific data; and storing a copy of the configuration file on the portable storage device, wherein the portable storage device includes an RF tag and the host includes an interface adapted to read an write to the RF tag, and further comprising the step of reading, by the host, the device specific data from the RF tag.

2. The method of claim 1, further comprising the step of interfacing the portable storage device to the new device and storing a copy of the configuration file on the new device.

3. The method of claim 2, wherein the configuration data includes a network identification and a shared secret, further comprising the step of using, by the new device, the shared secret to facilitate secure communication over the network.

4. The method of claim 1, further comprising the step of identifying second configuration data specific to the new device and modifying the configuration file to include the second configuration data.

5. The method of claim 4, wherein the configuration data further includes identification of a network location wherein third configuration data is stored, further comprising the step of, accessing, by the new device, the third configuration data.

6. The method of claim 1, wherein the portable storage device comprises a first connector and a second connector and wherein the first and second connectors are of different types.

7. A method for configuring a new device using a host computer having configuration data and a portable storage device, wherein the portable storage device is adapted to interface to the host and the new device and to transfer data therebetween, the method comprising:

interfacing the portable storage device to the host computer;

determining whether the portable storage device includes device specific data that identifies the new device;

selecting first configuration data to be included in a configuration file, wherein the first configuration data is usable by the new device, and wherein selecting the first configuration data comprises selecting device specific configuration data if the portable storage device includes the device specific data and selecting default configuration data if the portable storage device does not include the device specific data; and storing a copy of the configuration file on the portable storage device, wherein the portable storage device includes an RF tag and the host includes an interface adapted to read and write to the RF tag, and further comprising the step of writing the configuration file to the RF tag.

8. The method of claim 7, further comprising the step of interfacing the portable storage device to the new device and storing a copy of the configuration file on the new device.

9. The method of claim 8, wherein the configuration data includes a network identification and a shared secret, further comprising the step of using, by the new device, the shared secret to facilitate secure communication over the network.

10. The method of claim 7, further comprising the step of identifying second configuration data specific to the new device and modifying the configuration file to include the second configuration data.

11. The method of claim 10, wherein the configuration data further includes identification of a network location wherein third configuration data is stored, further comprising the step of, accessing, by the new device, the third configuration data.

12. The method of claim 7, wherein the portable storage device comprises a first connector and a second connector and wherein the first and second connectors are of different types.

13. A computer readable medium having stored thereon computer executable instructions for configuring a new device using a host computer having configuration data and a portable storage device, wherein the portable storage device is adapted to interface to the host and the new device and to transfer data therebetween, the instructions comprising:

interfacing the portable storage device to the host computer;

determining whether the portable storage device includes device specific data that identifies the new device;

selecting first configuration data to be included in a configuration file, wherein the first configuration data is usable by the new device, and wherein selecting the first configuration data comprises selecting device specific configuration data if the portable storage device includes the device specific data and selecting default configuration data if the portable storage device does not include the device specific data; and storing a copy of the configuration file on the portable storage device, wherein the portable storage device includes an RF tag and the host includes an interface adapted to read and write to the RF tag, and wherein the instructions further comprise writing the configuration file to the RF tag.

14. The computer readable medium of claim 13, wherein the instructions further comprise the step of interfacing the portable storage device to the new device and storing a copy of the configuration file on the new device.

15. The computer readable medium of claim 14, wherein the configuration data includes a network identification and a shared secret, further comprising the step of using, by the new device, the shared secret to facilitate secure communication over the network.

16. The computer readable medium of claim 13, wherein the instructions further comprise identifying second configuration data specific to the new device and modifying the configuration file to include the second configuration data.

17. The computer readable medium of claim 16, wherein the configuration data further includes identification of a network location wherein third configuration data is stored, further comprising the step of, accessing, by the new device, the third configuration data.

18. The computer readable medium of claim 13, wherein the portable storage device comprises a first connector and a second connector and wherein the first and second connectors are of different types.

* * * * *